United States Patent
Fujiwara

(10) Patent No.: US 7,608,946 B2
(45) Date of Patent: Oct. 27, 2009

(54) BOOSTING CIRCUIT AND INTEGRATED CIRCUIT HAVING THE SAME

(75) Inventor: Hirofumi Fujiwara, Ohtsu (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 12/167,287

(22) Filed: Jul. 3, 2008

(65) Prior Publication Data

US 2009/0009004 A1    Jan. 8, 2009

(30) Foreign Application Priority Data

Jul. 3, 2007   (JP) .............................. 2007-174776

(51) Int. Cl.
*H02J 9/00*    (2006.01)
*G05F 5/00*    (2006.01)

(52) U.S. Cl. ........................................ 307/80; 323/299
(58) Field of Classification Search ................. 307/80; 323/299
See application file for complete search history.

(56) References Cited

U.S. PATENT DOCUMENTS 6,362,609 B1 *  3/2002  Gailhard .................... 323/280
7,417,339 B2 *  8/2008  Cheng ........................ 307/130

FOREIGN PATENT DOCUMENTS

JP           8-33321       2/1996

* cited by examiner

*Primary Examiner*—Albert W Paladini
*Assistant Examiner*—Michael Rutland Wallis
(74) *Attorney, Agent, or Firm*—Young & Thompson

(57) ABSTRACT

In a boosting circuit, a power supply section includes a first power supply configured to supply a first reference voltage and a second power supply configured to supply a second reference voltage. A boosting section includes boosting switches and boosting capacitors, and is configured to generate a boosted voltage to an output node by using the boosting switches and the boosting capacitors in response to the first reference voltage and the second reference voltage. A switching circuit is configured to connect the output node and one of the first power supply and the second power supply based on a difference between the first reference voltage and the second reference voltage.

11 Claims, 11 Drawing Sheets

Fig. 7

| | COMPARATOR OUTPUT | PATH CONNECTION SWITCH |
|---|---|---|
| FIRST INPUT REFERENCE VOLTAGE > SECOND INPUT REFERENCE VOLTAGE | High | CONNECT FIRST POWER SUPPLY CIRCUIT AND OUTPUT TERMINAL |
| FIRST INPUT REFERENCE VOLTAGE < SECOND INPUT REFERENCE VOLTAGE | Low | CONNECT SECOND POWER SUPPLY CIRCUIT AND OUTPUT TERMINAL |

38

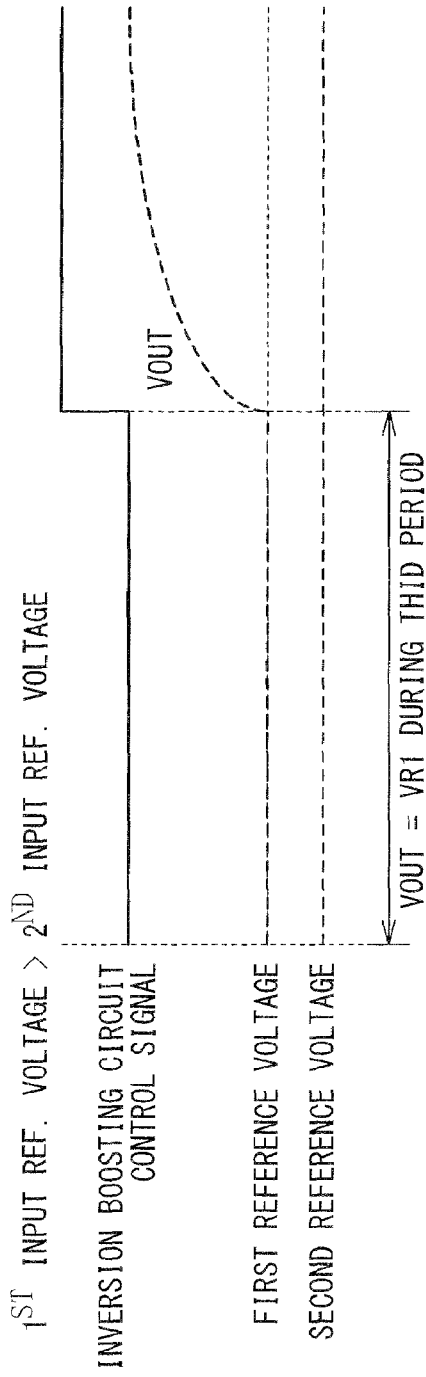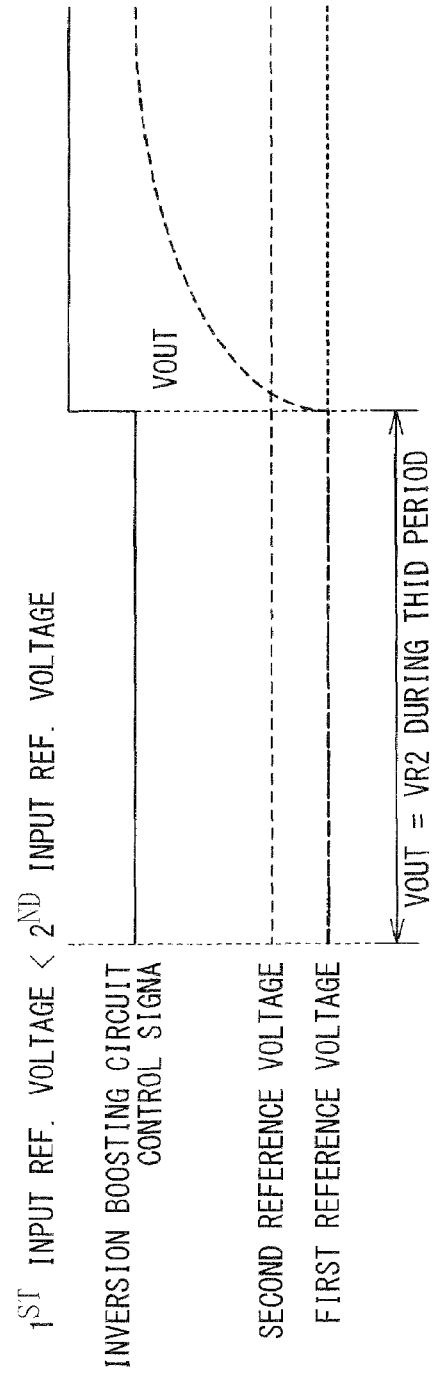

| OUTPUT VOLTAGE SETTING VALUE | COMPARATOR OUTPUT | PATH CONNECTION SWITCH |
|---|---|---|
| FIRST INPUT REFERENCE VOLTAGE > SECOND INPUT REFERENCE VOLTAGE | High | CONNECT FIRST REFERENCE VOLTAGE GENERATING CIRCUIT AND OUTPUT TERMINAL |
| FIRST INPUT REFERENCE VOLTAGE < SECOND INPUT REFERENCE VOLTAGE | Low | CONNECT SECOND REFERENCE VOLTAGE GENERATING CIRCUIT AND OUTPUT TERMINAL |

BOOSTING CIRCUIT AND INTEGRATED CIRCUIT HAVING THE SAME

INCORPORATION BY REFERENCE

This patent application claims priority on convention based on Japanese Patent Application No. 2007-174776. The disclosure thereof is incorporated herein by reference.

BACKGROUND OF THE INVENTION

1. Field of the Invention

The present invention relates to a boosting circuit and an integrated circuit including the boosting circuit.

2. Description of Related Art

A boosting circuit is built in a driver IC for driving a display apparatus of a mobile terminal. As such a boosting circuit, a charge pump type boosting circuit is known which can output a voltage twice or more as high as an input voltage. In the charge pump type boosting circuit, two or more capacitors may be used. Also, two or more independent power sources may be provided to charge the capacitors. Furthermore, there is a case that a boosted voltage is outputted by connecting the power supply serially to the capacitor.

For example, a charge pump type boosting circuit is known which has two capacitors and can output an output voltage three times as high as an input voltage. In such a case, the charge pump type boosting circuits may operate in response to two input reference voltages. A power supply for supplying the input reference voltages may be provided in the outside of the charge pump type boosting circuit. When two of the input reference voltages supplied from the power supply (hereinafter, to be referred to as an external power supply) are defined as a first reference voltage VR1 and a second reference voltage VR2, it is possible to set the boosted output voltage to a desired value by changing the first reference voltage VR1 and the second reference voltage VR2. When the output voltage of the external power supply is set to an optional value to set the boosted output voltage VOUT to a desired value, it is required to be able to select VR1>VR2 or VR1<VR2, depending of design of components of the boosting circuit. To satisfy the requirement, the boosting circuit is known that can be used in the conditions VR1>VR2 and VR1<VR2, as disclosed in Japanese Patent Application Publication (JP-A-Heisei 8-33321).

FIG. 1 is a circuit diagram showing a configuration of a boosting circuit disclosed in Japanese Patent Application Publication (JP-A-Heisei 8-33321). To simplify the description of an operation of the conventional boosting circuit, the number of capacitors in the circuit is decreased from three to two in a charge pump type boosting circuit 101 shown in FIG. 1. In FIG. 1, VCC and a boosting block described in the conventional circuit are used in common. The charge pump type boosting circuit 101 includes a boosting circuit section 102, a first power supply 103 for supplying the first reference voltage VR1, a second power supply 104 for supplying the second reference voltage VR2 and a rectifier circuit 107. The output voltage VOUT is generated by the boosting circuit section 102 and is outputted from an output node 106.

The boosting circuit section 102 has a first capacitor 111 and a second capacitor 112. The boosting circuit section 102 also has a plurality of switches (first switch 113 to fourth switch 116). The second power supply 104 is provided at the outside of the boosting circuit section 102 and is connected to a first node (negative side) of the first capacitor 111 through the first switch 113 and to a second node (positive side) of the first capacitor 111 through a first diode 117. The second node (positive side) of the first capacitor 11 is connected to the first node (negative side) of the second capacitor 112 through the second switch 114.

The first power supply 103 is provided at the outside of the boosting circuit section 102 and is connected to a second node (positive side) of the second capacitor 112 through a second diode 118. The second node (positive side) of the second capacitor 112 is connected to the output node 106 through a third diode 119 of the rectifier circuit 107. A first node (negative side) of the second capacitor 112 is connected to the first diode 117 through the second switch 114.

The charge pump type boosting circuit 101 performs a boosting operation by switching the plurality of switches (first switch 113 to fourth switch 116). Each of the first switch 113 to fourth switch 116 is activated in response to a clock signal applied thereto. FIG. 2 is a circuit diagram showing a configuration of a clock generating circuit 120 for generating the clock signal used for the boosting operation of the charge pump type boosting circuit 101. A first clock signal 121 is generated from the clock generating circuit 120 and is supplied to the third switch 115 and the fourth switch 116. A second clock 122 is supplied to the first switch 113 and the second switch 114. As shown in FIG. 1, the conventional charge pump type boosting circuit 101 can operate in case of VR1>VR2 and VR1<VR2.

In the conventional charge pump type boosting circuit 101 shown in FIG. 1, a charging voltage of the first capacitor 111 can fall below the second reference voltage VR2 due to a voltage drop by the first diode 117. Similarly, a charging voltage of the second capacitor 112 can fall below the first reference voltage VR1 due to a voltage drop by the second diode 118. The output voltage VOUT of the output node 106 can fall below the voltage appearing at the second node (positive side) of the second capacitor 112 at the time of discharging due to a voltage drop through the third diode 119.

Furthermore, in the conventional charge pump type boosting circuit 101, when the boosting circuit section 102 does not operate, the output voltage VOUT becomes a voltage lower than the first reference voltage VR1 due to a voltage drop by the second diode 118 and a voltage drop by the third diode 119. At this time, given that a voltage difference across the second diode 118 is a first voltage difference VFD2 and a voltage difference across the third diode 119 is a second voltage difference VFD3, when the voltage exceeding (VR1−VFD2−VFD3) is applied to the output node 106 as noise, there is a case that the voltage VOUT of the output node 106 during the non-operation of the boosting circuit section 102 cannot be fixed.

SUMMARY

In a first aspect of the present invention, a boosting circuit includes a power supply section including a first power supply configured to supply a first reference voltage and a second power supply configured to supply a second reference voltage; a boosting section including boosting switches and at least a boosting capacitor, and configured to generate a boosted voltage to an output node by using the boosting switches and the boosting capacitors in response to the first reference voltage and the second reference voltage; and a switching circuit configured to connect the output node and one of the first power supply and the second power supply based on a difference between the first reference voltage and the second reference voltage.

In a second aspect of the present invention, an integrated circuit includes a boosting circuit configured to generate a boosted voltage through an output node; and a control circuit configured to generate a control signal to control the boosting circuit. The boosting circuit includes a power supply section including a first power supply configured to supply a first reference voltage and a second power supply configured to supply a second reference voltage; a boosting section configured to generate the boosted voltage in response to the first reference voltage and the second reference voltage; a comparator configured to compare the first reference voltage and the second reference voltage; and a switching circuit configured to control connection of an output node and the power supply section. The comparator outputs a first comparison signal when the first reference voltage is higher than the second reference voltage and a second comparison signal when the second reference voltage is higher than the first reference voltage. The switching circuit connects the first power supply and the output node in response to the first comparison signal and connects the second power supply and the output node in response to the second comparison signal.

According to the present invention, the circuit can be configured so that the maximum voltage of the boosting circuit may become the output voltage VOUT without depending on an operating state of the boosting circuit.

BRIEF DESCRIPTION OF THE DRAWINGS

The above and other objects, advantages and features of the present invention will be more apparent from the following description of certain embodiments taken in conjunction with the accompanying drawings, in which:

FIG. 7 is a table showing a connection state of a path switch;

FIGS. 10A and 10B are waveform charts showing relationship between the voltage of the power supply section and the voltage of the output node in the comparison example;

FIG. 14 is a table showing a connection state of a path switch in the second embodiment.

DESCRIPTION OF THE PREFERRED EMBODIMENTS

Hereinafter, a semiconductor integrated circuit with a boosting circuit according to the present invention will be described with reference to the attached drawings.

First Embodiment

Figure 1:
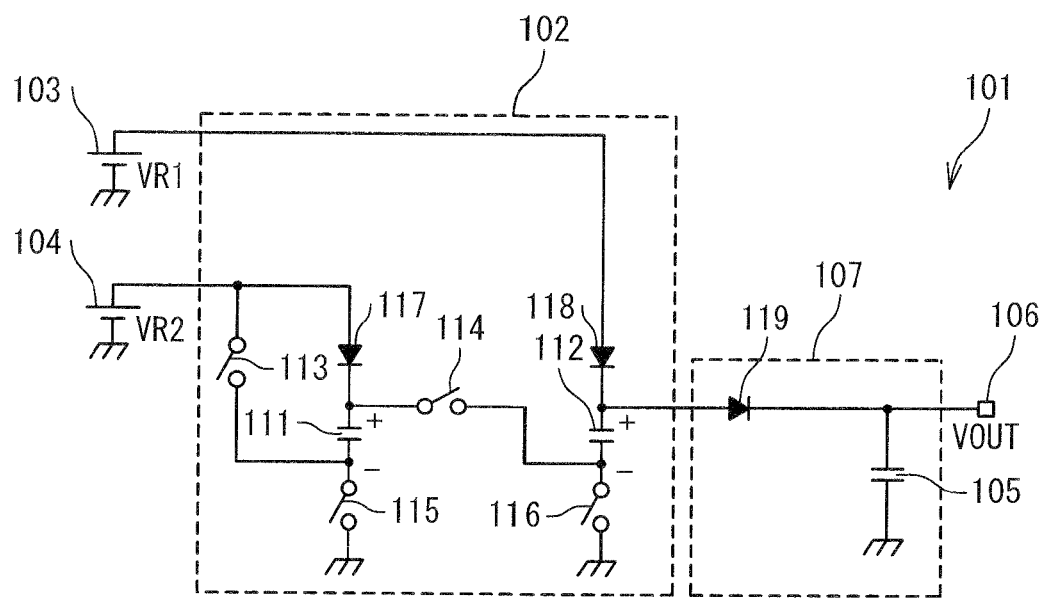
FIG. 1 is a circuit diagram showing a configuration of a conventional boosting circuit.
Figure 2:
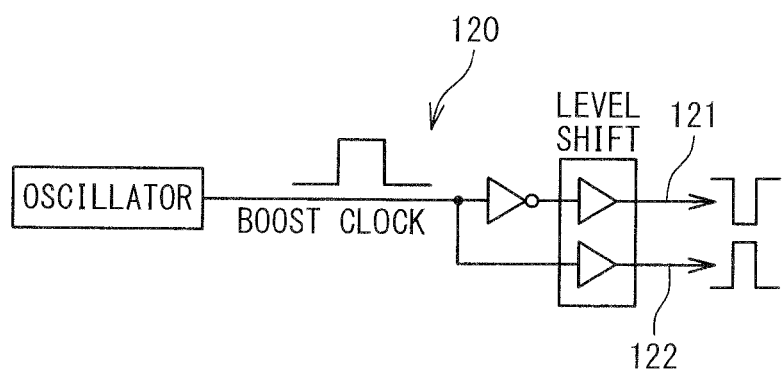
FIG. 2 is a circuit diagram showing a configuration of a clock generating circuit for generating clock signals used for a boosting operation.
Figure 3:
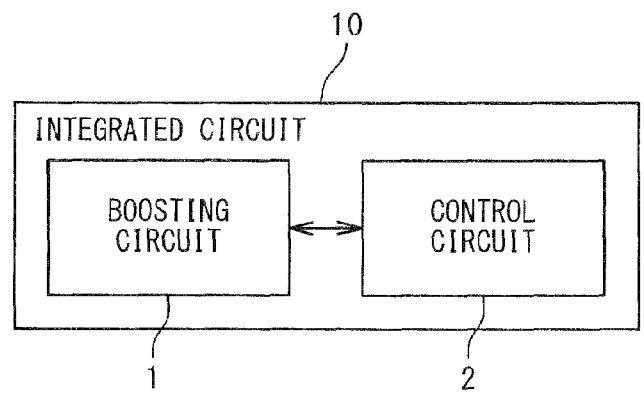
FIG. 3 is a block diagram showing a configuration of an integrated circuit having a charge pump type boosting circuit according to a first embodiment of the present invention.

FIG. 3 is a block diagram showing a configuration of a semiconductor integrated circuit 10 having a charge pump type boosting circuit 1 according to a first embodiment of the present invention. The semiconductor integrated circuit 10 in the first embodiment is exemplified by a driver IC for driving a display unit of a mobile terminal. The semiconductor integrated circuit 10 includes a charge pump type boosting circuit 1 and a control circuit 2. The charge pump type boosting circuit 1 generates a voltage higher than a power supply voltage (hereinafter, to be referred to as a boosted voltage). The control circuit 2 controls an operation of the charge pump type boosting circuit 1 for generating the boosted voltage.

Figure 4:
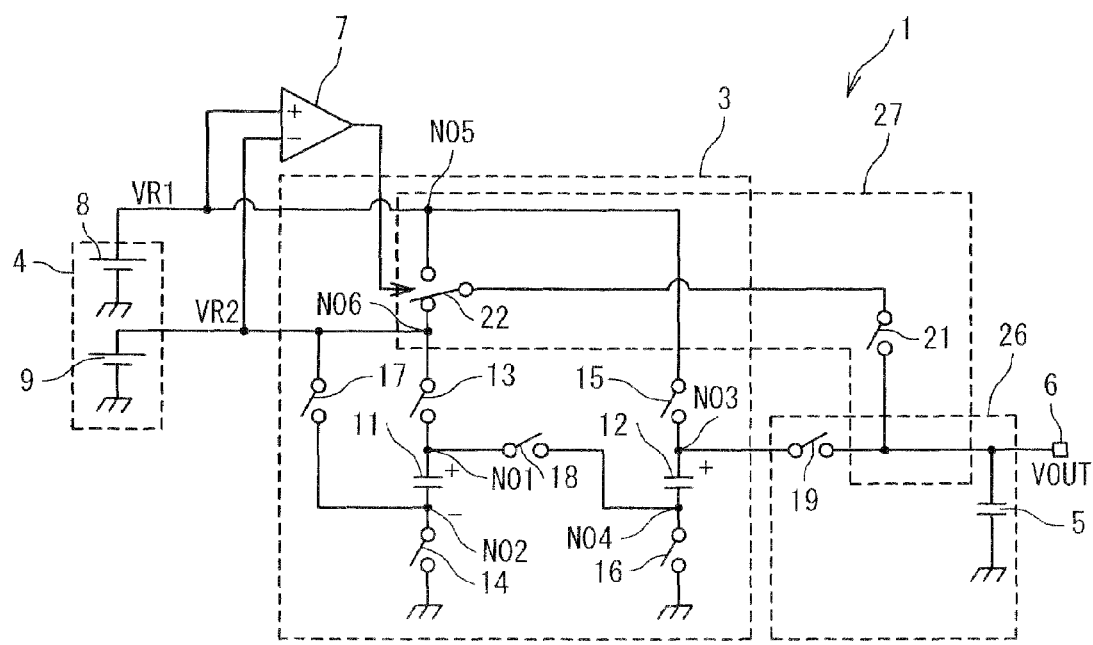
FIG. 4 is a circuit diagram showing a configuration of the charge pump type boosting circuit in the first embodiment.

FIG. 4 is a circuit diagram showing a configuration of the charge pump type boosting circuit 1. The charge pump type boosting circuit 1 includes a boosting section 3, a power supply section 4 for supplying a reference voltage to the boosting section 3 so as to generate the boosted voltage, an output circuit 26 for supplying the boosted voltage (an output voltage VOUT) to an output node 6, a power supply path 27 and a comparator 7. When the first reference voltage VR1 is same as a second reference voltage VR2 (=a reference voltage VR), the charge pump type boosting circuit 1 in the first embodiment drives a first switch 13 to a sixth switch 18 and a seventh switch 19 of the output circuit 26 by using a non-inversion clock signal CLK1 and an inversion clock signal CLK2 which are generated based on a reference clock signal outputted from an oscillator (not shown). A plurality of switches provided in the boosting circuit 1 are switched in response to the non-inversion clock signal CLK1 or the inversion clock signal CLK2, to charge/discharge a first capacitor 11 and a second capacitor 12. Through this operation, the boosting circuit 1 can function as a triple charge pump circuit for generating the boosted voltage of VR×3. The boosting circuit 1 outputs the boosted voltage as the output voltage VOUT from the output node 6. When the first reference voltage VR1 is different from the second reference voltage VR2, the voltage:

$$VR2+VR2+VR1$$

is outputted from the output node 6 as the output voltage VOUT.

The power supply section 4 has a first power supply 8 and a second power supply 9. The first power supply 8 supplies the first reference voltage VR1 to the boosting section 3 and the second power supply 9 supplies the second reference voltage VR2 to the boosting section 3. In the charge pump type boosting circuit 1 in the first embodiment, the first power supply 8 and the second power supply 9 are individually provided. By optionally setting values of the first reference voltage VR1 and the second reference voltage VR2, the boosting circuit 1 is not restricted to a function of the triple charge pump 1 but can generate the boosted voltage other than the voltage three times as high as an input voltage. For this reason, hereinafter, a configuration and an operation of the semiconductor integrated circuit with the boosting circuit in the first embodiment will be described in case of the first reference voltage VR1≠the second reference voltage VR2.

The output circuit 26 supplies the output voltage VOUT outputted from the boosting section 3 to the output node 6. The output circuit 26 includes the seventh switch 19 and an output capacitor 5. An input terminal of the seventh switch 19 as an input of the output circuit 26 is connected to a third node N03. An output node of the seventh switch 19 is connected to one end of the output capacitor 5 and the output node 6. The other terminal of the output capacitor 5 is grounded.

In response to a control signal sent from the control circuit 2, the boosting section 3 generates the boosted voltage. The boosting section 3 includes capacitors (the first capacitor 11 and the second capacitor 12) and switches (the first switch 13 to the sixth switch 18). The boosting section 3 switches a connection state of the plurality of switches (the first switch 13 to the sixth switch 18) in response to the control signals sent from the control circuit 2, to generate the boosted voltage.

One end of the first capacitor 11 is connected to the first switch 13 through a first node N01. The other end of the first capacitor 11 is connected to the second switch 14 through a second node N02. The first node N01 is connected to the second power supply 9 of the power supply section 4 through the first switch 13. The second node N02 is connected to the second power supply 9 of the power supply section 4 through the fifth switch 17. The second node N02 is grounded through the second switch 14. One end of the second capacitor 12 is connected to the third switch 15 through the third node N03. The other end of the second capacitor 12 is connected to the fourth switch 16 through a fourth node N04. The third node N03 is connected to the first power supply 8 of the power supply section 4 through the third switch 15. The fourth node N04 is grounded through the fourth switch 16. The fourth node N04 is connected to the first node N01 through the sixth switch 18.

The power supply path 27 includes a path connection switch 21 and a path switch 22. In response to a signal outputted from the comparator 7 (hereinafter, to be referred to as a switching signal), the path switch 22 connects the first power supply 8 or the second power supply 9 to the path connection switch 21. In response to the control signal sent from the control circuit 2, the path connection switch 21 disconnects the output node 6 from the path switch 22. The path connection switch 21 in the first embodiment closes when a high level is supplied and opens when a low level is supplied.

The comparator 7 has a non-inversion input terminal and an inversion input terminal. The non-inversion input terminal of the comparator 7 is connected to the first power supply 8. The inversion input terminal of the comparator 7 is connected to the second power supply 9. The comparator 7 compares the first reference voltage VR1 supplied from the first power supply 8 with the second reference voltage VR2 supplied from the second power supply 9 and outputs the switching signal based on the comparison result. In response to the switching signal, the path switch 22 determines that the path connection switch 21 is connected to a side of a fifth node N05 or a side of a sixth node N06.

Figure 5:
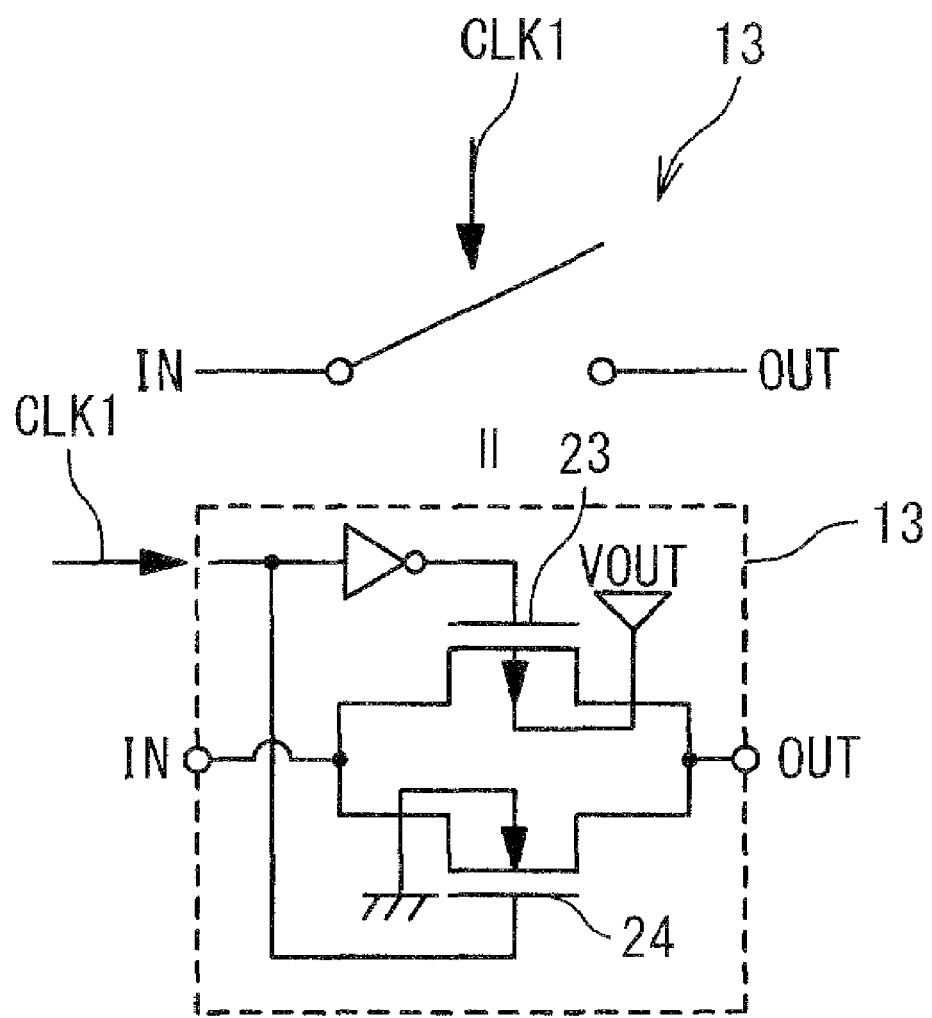
FIG. 5 is a circuit diagram showing a configuration of a switch.

FIG. 5 is a circuit diagram showing a configuration of the plurality of switches (the first switch 13 to the sixth switch 18) provided in the boosting section 3. Each of the switches (the first switch 13 to the sixth switch 18) has a similar configuration. Thus, hereinafter, with respect to the first switch 13, a configuration of the switch in the first embodiment will be described. Referring to FIG. 5, the first switch 13 is formed from a transfer gate having a P channel MOS transistor 23 and an N channel MOS transistor 24.

The non-inversion clock signal CLK1 is supplied to a gate of the P channel MOS transistor 23 through an inverter and a gate of the N channel MOS transistor 24. The first switch 13 is set to an ON state when the non-inversion clock signal CLK1 of a high level is supplied and is set to an OFF state when the non-inversion clock signal CLK1 of a low level is supplied. The P channel MOS transistor 23 is provided with a back gate. The back gate of the P channel MOS transistor 23 is connected to the output node 6 which reaches a maximum voltage during the boosting operation and receives the output voltage VOUT through the output node 6. A ground voltage is supplied to a back gate of the N channel MOS transistor 24.

Figure 6:
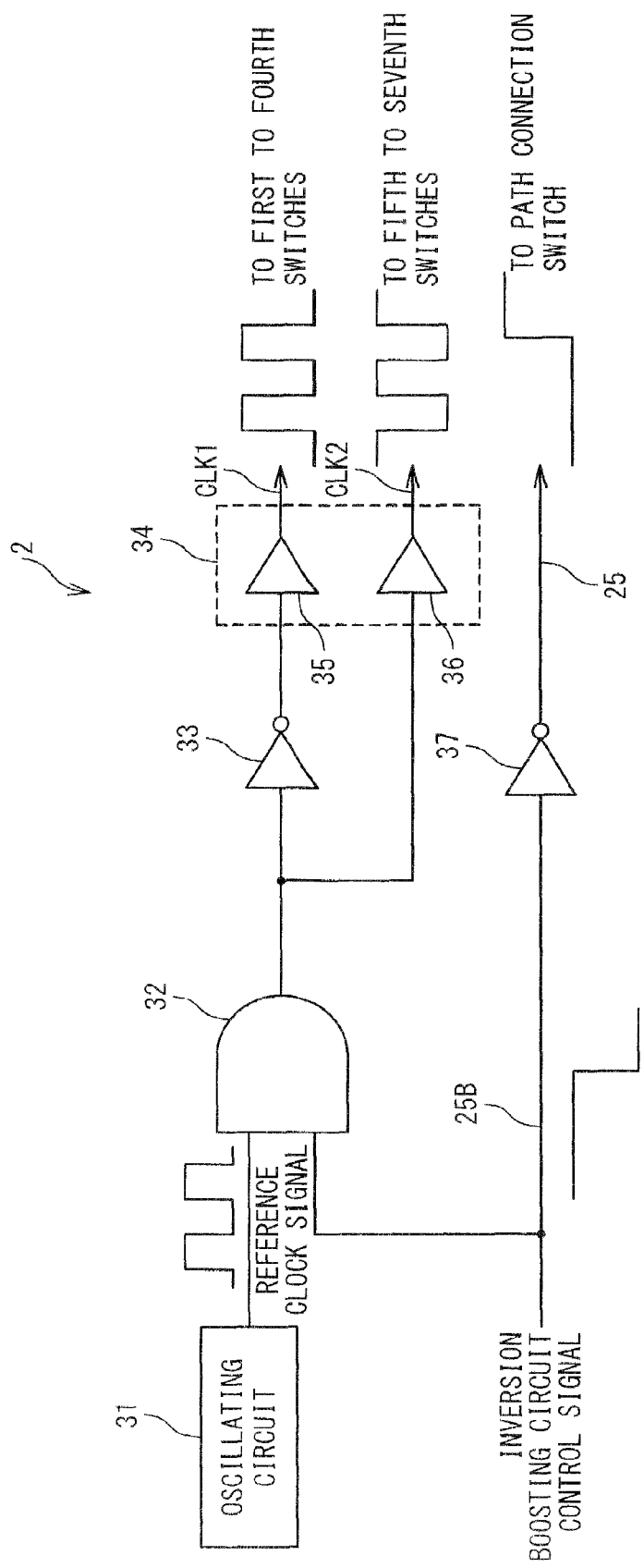
FIG. 6 is a circuit diagram showing a configuration of a control circuit in the charge pump type boosting circuit in the first embodiment.

FIG. 6 is a circuit diagram showing a configuration of the control circuit 2. The control circuit 2 includes an oscillating circuit 31 for supplying a reference clock signal, an AND circuit 32 for outputting a signal of a same phase as the reference clock signal, a first inverter 33 for inverting the output of the AND circuit 32, a level shifter 34 and a second inverter 37.

The level shifter 34 has a first level shift buffer 35 and a second level shift buffer 36. The first level shift buffer 35 outputs a non-inversion clock signal CLK1, and the second level shift buffer 36 outputs an inversion clock signal CLK2. The non-inversion clock signal CLK1 is supplied to the first switch 13, the second switch 14, the third switch 15 and the fourth switch 16. The inversion clock signal CLK2 is supplied to the fifth switch 17, the sixth switch 18 and the seventh switch 19. The second inverter 37 outputs a boosting circuit control signal 25 obtained by inverting an inversion boosting circuit control signal 25B. The boosting circuit control signal 25 is supplied to the path connection switch 21. The path connection switch 21 closes when the boosting circuit control signal 25 is in the high level and opens when the boosting circuit control signal 25 is in the low level.

As shown in FIG. 6, when the inversion boosting circuit control signal 25B supplied to the AND circuit 32 is in the high level, the AND circuit 32 outputs a signal of the same phase as the reference clock signal. At this time, the level shifter 34 outputs the non-inversion clock signal CLK1 and the inversion clock signal CLK2. In response to the non-inversion clock signal CLK1 and the inversion clock signal CLK2, the boosting section 3 performs the boosting operation. Specifically, when a signal of the high level is supplied as the inversion boosting circuit control signal 25B, the charge pump type boosting circuit 1 performs the boosting operation. At this time, the boosting circuit control signal 25 becomes a low level and the path connection switch 21 disconnects the path switch 22 from the output node 6. In response to the non-inversion clock signal CLK1 and the inversion clock signal CLK2, the first switch 13 to the seventh switch 19 open/close to charge/discharge the first capacitor 11 and the second capacitor 12.

When the non-inversion clock signal CLK1 is in the high level (the inversion clock signal CLK2 is in the low level), the first switch 13 to the fourth switch 16 are activated. At this time, the first capacitor 11 is charged with the second reference voltage VR2 and the second capacitor 12 is charged with the first reference voltage VR1. When the inversion clock signal CLK2 is in the high level (the non-inversion clock signal CLK1 is in the low level), the fifth switch 17 to the seventh switch 19 are activated. At this time, the first capacitor 11 and the second capacitor 12 are discharged. As a result of the discharging operation, the boosted voltage is supplied to the output node 6, and the voltage value is VR2+VR2+VR1.

When the inversion boosting circuit control signal 25B supplied to the AND circuit is in the low level, the AND circuit 32 outputs a signal of the low level. For this reason, the switches (the first switch 13 to the sixth switch 18) of the boosting section 3 stop the boosting operation. Specifically, when a signal of the low level is supplied as the inversion boosting circuit control signal 25B, the charge pump type boosting circuit 1 stops the boosting operation. At this time, the first switch 13 to the fourth switch 16 maintain an activated state. The fifth switch 17 to the seventh switch 19 maintain a non-activated state. In this case, the path connection switch 21 maintains the activated state. Therefore, the path connection switch 21 connects the output node 6 to the path switch 22.

FIG. 7 is a table showing relationship between the switching signal outputted from the comparator 7 based on the states of the first reference voltage VR1 and the second reference voltage VR2 which are outputted from the power supply section 4 and a connection state of the path switch 22 (hereinafter referred to as a switch setting table 38). As shown in the switch setting table 38, the comparator 7 in the first embodiment outputs a signal of the high level as the switching signal in case of VR1>VR2, and outputs a signal of the low level as the switching signal in case of VR1<VR2.

Here, in response to the switching signal of the high level, the path switch 22 in the first embodiment connects the first power supply 8 to the path connection switch 21. In response to the switching signal of a low level, the path switch 22 in the first embodiment connects the second power supply 9 to the path connection switch 21.

Figure 8A:
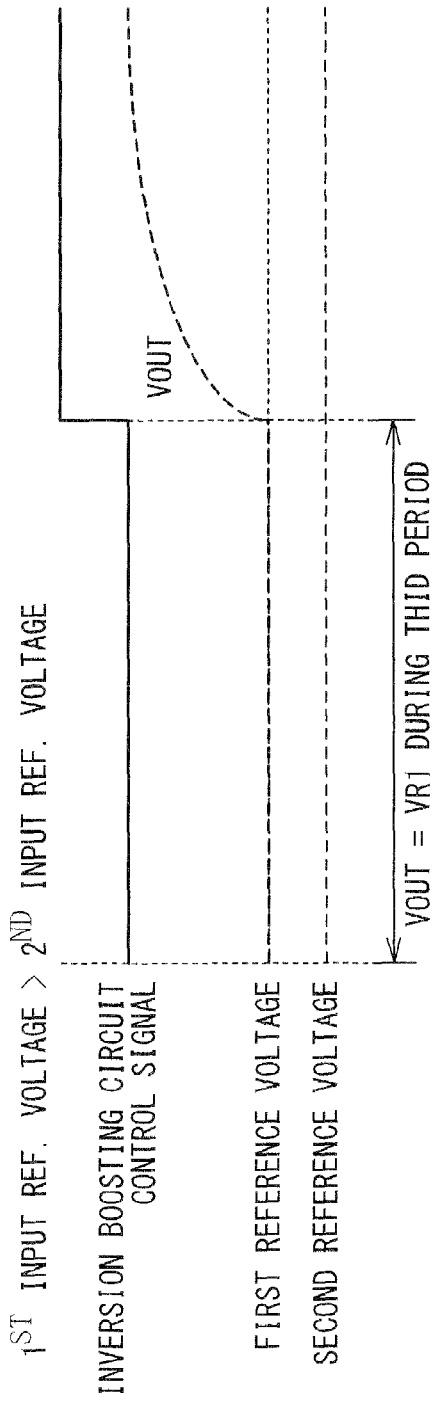
FIGS. 8A and 8B are waveform charts showing relationship between a voltage of a power supply section and a voltage of an output node in the charge pump type boosting circuit in the first embodiment.
Figure 8B:
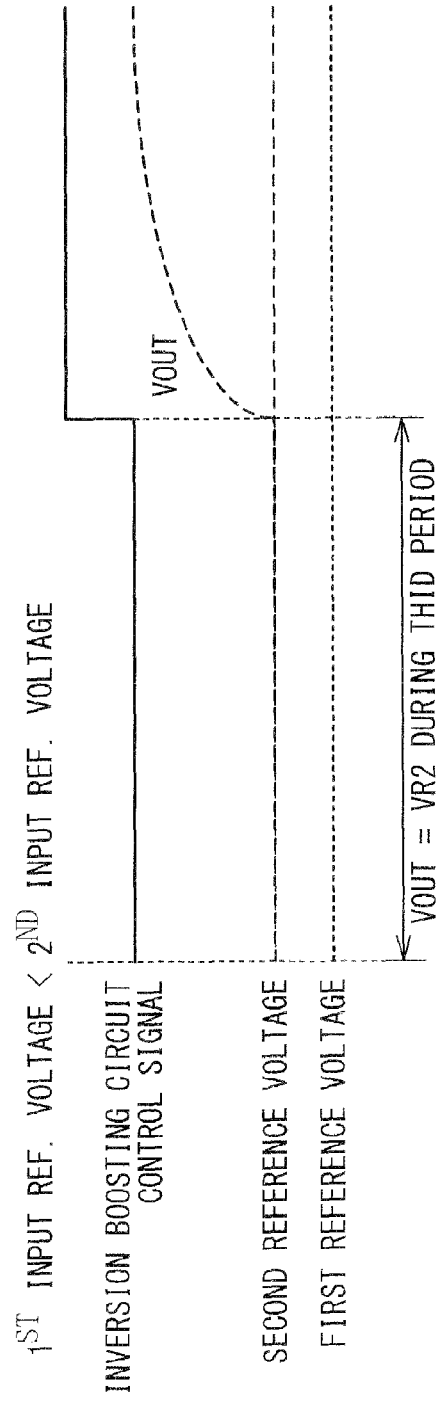

FIGS. 8A and 8B are waveforms chart showing relationship between the voltage of the power supply section 4 and the voltage of the output node 6 in the charge pump type boosting circuit 1 in the present embodiment. FIG. 8A shows the relationship between the voltage of the power supply section 4 and the voltage of the output node 6 in case of VR1>VR2. FIG. 8B shows the relationship between the voltage of the power supply section 4 and the voltage of the output node 6 in case of VR1<VR2.

As shown in the switch setting table 38, in the case of VR1>VR2, the comparator 7 outputs the switching signal of the high level. Thus, the path switch 22 connects the first power supply 8 to the path connection switch 21. At this time, when the inversion boosting circuit control signal 25B is in the low level (the boosting circuit control signal 25 is in the high level), the path connection switch 21 is activated and the output node 6 is connected to the first power supply 8. Accordingly, as shown in FIG. 8A, until the inversion boosting circuit control signal 25B is set to the high level, the state that the output voltage VOUT is equal to the first reference voltage VR1 is maintained.

In case of VR1<VR2, the comparator 7 outputs a switching signal of the low level. Thus, the path switch 22 connects the second power supply 9 to the path connection switch 21. At this time, when the inversion boosting circuit control signal 25B is in the low level (the boosting circuit control signal 25 is in the high level), the path connection switch 21 is activated and the output node 6 is connected to the second power supply 9. Accordingly, as shown in FIG. 8B, until the inversion boosting circuit control signal 25B is set to the high level, the state that the output voltage VOUT is equal to the second reference voltage VR2 is maintained.

The charge pump type boosting circuit 1 in the first embodiment operates in response to different reference voltages (the first reference voltage VR1, the second reference voltage VR2). At this time, the power supply path 27 of the boosting circuit 1 connects the power supply supplying the higher voltage of the reference voltages to the output node 6. In other words, in the first embodiment, the power supply path 27 supplies a maximum voltage in the circuit to the output node 6. Thereby, the maximum voltage in the circuit is supplied to the back gate of the MOS transistor (for example, P channel MOS transistor 23) of the transfer gate of the switch through the output node 6. Thus, even if noise is applied to the output node 6 while the boosting section 3 does not operate, the voltage of the output node 6 can be fixed.

COMPARISON EXAMPLE

Figure 9:
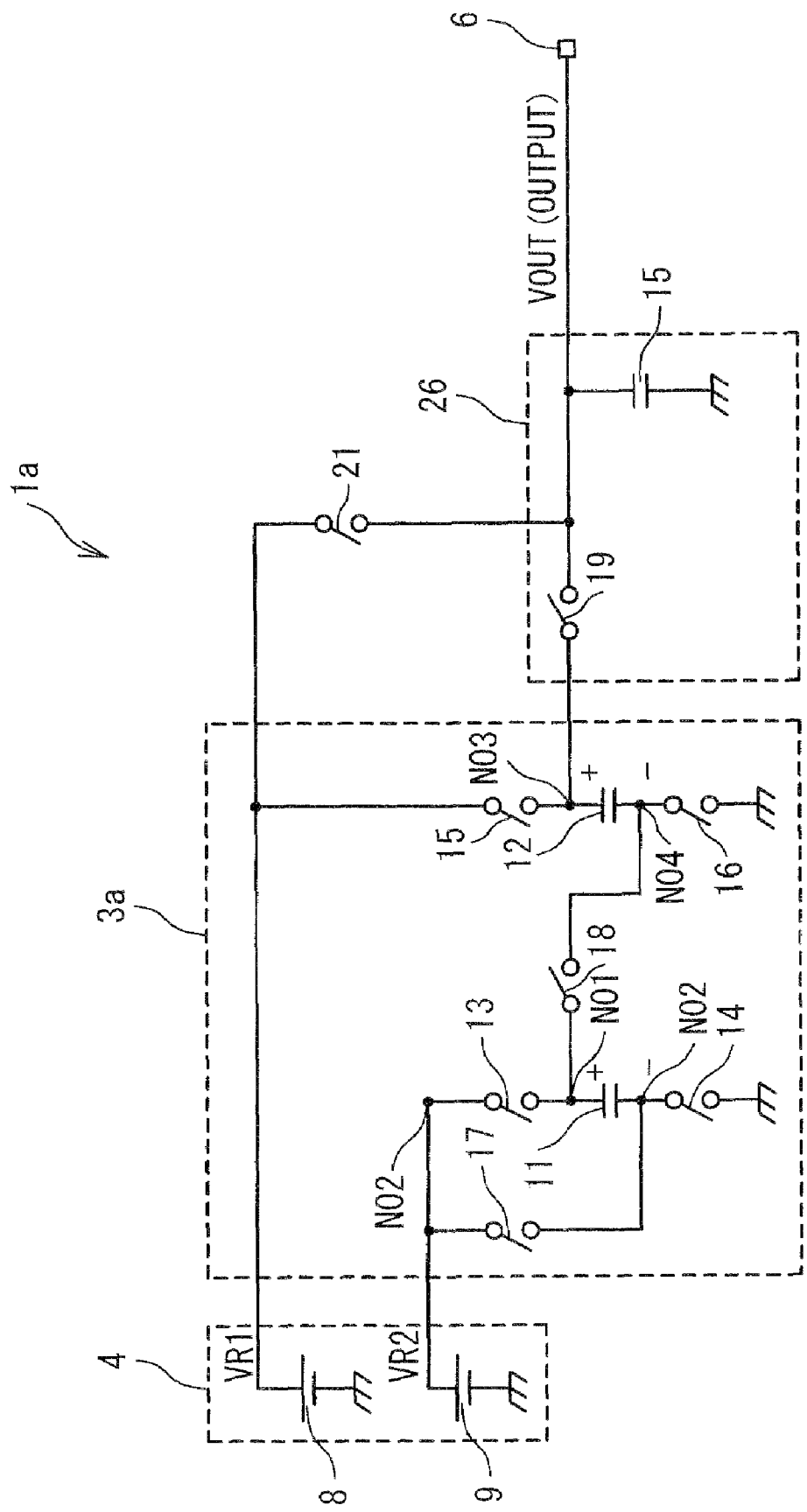
FIG. 9 is a circuit diagram showing a configuration of the charge pump type boosting circuit in a comparison example.

Hereinafter, as a charge pump type boosting circuit 1 having no power supply path 27 in the present embodiment (hereinafter to be referred to as a charge pump type comparison boosting circuit 1a), a comparison example in the present embodiment will be described. It should be noted that in a following comparison example, same reference numerals used in the above description are given to components which have same configurations and perform same operations as those in the above-mentioned embodiments. Accordingly, in the following comparison example, description of the components is omitted. FIG. 9 is a circuit diagram showing a configuration of the charge pump type comparison boosting circuit 1a in the comparison example. The comparison boosting circuit 1a includes the power supply section 4, a boosting section 3a and the output circuit 26. The output node 6 of the comparison boosting circuit 1a is connected to the first power supply 8 through the path connection switch 21.

When the first reference voltage VR1 is same as the second reference voltage VR2 (=reference voltage VR), the comparison boosting circuit 1a drives the switches (the first switch 13 to the sixth switch 18) and the seventh switch 19 of the output circuit 26 by using the non-inversion clock signal CLK1 and the inversion clock signal CLK2, like the charge pump type boosting circuit 1. When the first capacitor 11 and the second capacitor 12 perform the charging/discharging operation in response to the non-inversion clock signal CLK1 and the inversion clock signal CLK2, (3×VR) or (VR2+VR2+VR1) is outputted from the output node 6 as the output voltage VOUT.

When a signal of a low level as the inversion boosting circuit control signal 25B is supplied to the comparison boosting circuit 1a, the comparison boosting circuit 1a stops the boosting operation. At this time, the first switch 13 to the fourth switch 16 maintain the activated state. The fifth switch 17 to the seventh switch 19 maintain the non-activated state. In this case, the path connection switch 21 maintains the activated state. Accordingly, the output voltage VOUT of the output node 6 (output voltage VOUT) is equal to the first reference voltage VR1.

FIGS. 10A and 10B are waveform charts showing relationship between the voltage of the power supply section 4 and the voltage of the output node 6 in the comparison boosting circuit 1a. FIG. 10A shows the relationship between the voltage of the power supply section 4 and the voltage of the output node 6 in case of VR1>VR2. FIG. 10B shows the relationship between the voltage of the power supply section 4 and the voltage of the output node 6 in case of VR1<VR2.

Referring to FIGS. 10A and 10B, in case of both of VR1>VR2 and VR1<VR2, while the comparison boosting circuit 1a does not operate, the relationship that the output voltage VOUT=the first reference voltage VR1 is satisfied. Furthermore, when the comparison boosting circuit 1a performs the boosting operation, the relationship that the output voltage VOUT=the second reference voltage VR2+the second reference voltage VR2+the first reference voltage VR1 is satisfied. It should be noted that the comparison charge pump type boosting circuit 1a stops the boosting operation. At this time, the back gates of the P channel MOS transistors of the first switch 13 to the seventh switch 19 have a same voltage as the first reference voltage VR1. At this time, IN terminals of the first switch 13, the fifth switch 17 and the sixth switch 18 are set to the second reference voltage VR2.

Referring to FIG. 10B, in case of VR1<VR2, when the comparison boosting circuit 1a stops the boosting operation, the back gate of the P channel MOS transistor has a lower voltage than that of the IN terminal.

Figure 11:
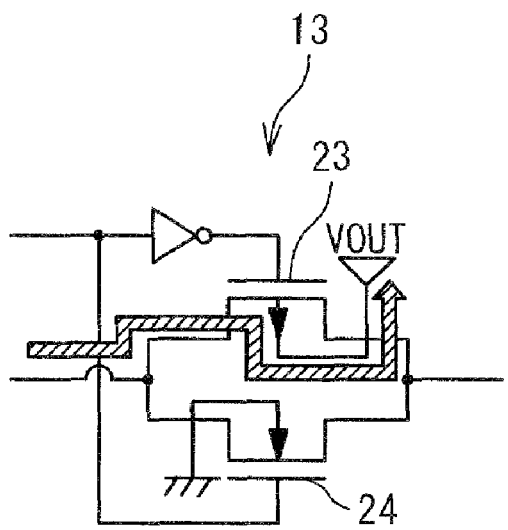
FIG. 11 is a circuit diagram showing an operation of the switch in the comparison example.

FIG. 11 is a circuit diagram showing an operation of the switch when the comparison boosting circuit 1a stops the boosting operation in case VR1<VR2. As shown in FIG. 11, when the comparison boosting circuit 1a stops the boosting operation, a current path from the second reference voltage VR2 to the output node VOUT (=first reference voltage VR1) through a PN-junction diode VF formed from the IN terminal and the back gate of the P channel MOS transistor is formed in the switch (for example, first switch 13).

Figure 12:
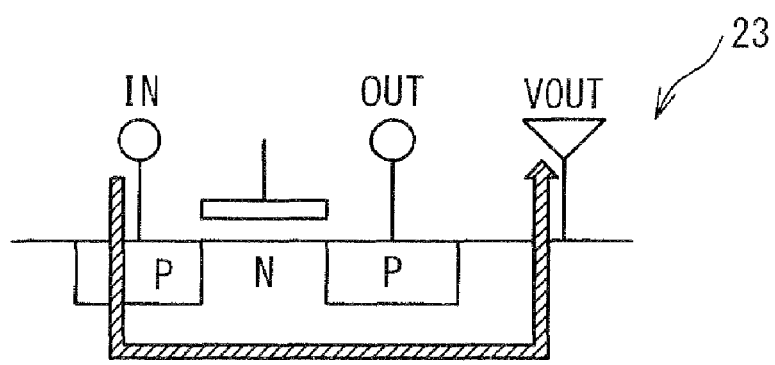
FIG. 12 is a sectional view showing an operation of a P channel MOS transistor of the switch in the comparison example.

FIG. 12 is a sectional view showing an operation of the P channel MOS transistor 23 of the switch. FIG. 12 shows a cross section when the comparison boosting circuit 1a stops the boosting operation in case of VR1<VR2. As shown in FIG. 12, in the P channel MOS transistor 23, the relationship that the voltage of the IN terminal≦the back gate voltage of the P channel MOS transistor is satisfied in the first switch 13, the fifth switch 17 and the sixth switch 18 to which the second reference voltage VR2 is supplied, because of the relationship of the first reference voltage VR1<the second reference voltage VR2. For this reason, in the comparison boosting circuit 1a, there is a case that current may be continuously flow from the IN terminal to the output node 6 through the back gate of the P channel MOS transistor 23.

In the charge pump type boosting circuit 1 in the first embodiment, while the boosting operation is stopped, the comparator 7 compares the first reference voltage VR1 of the first power supply 8 with the second reference voltage VR2 of the second power supply 9 and the power supply path 27 connects a higher voltage to the output node 6. Thus, the charge pump type boosting circuit 1 in the first embodiment can suppress an increase in power consumption while stabilizing the output voltage VOUT.

Second Embodiment

Hereinafter, the semiconductor integrated circuit with the boosting circuit according to a second embodiment of the present invention will be described below. It should be noted that in the second embodiment, the same reference numerals used in the above description are given to elements which have a same configuration and perform a same operation as those in first embodiment. Accordingly, in the second embodiment, description of the elements is omitted.

Figure 13:
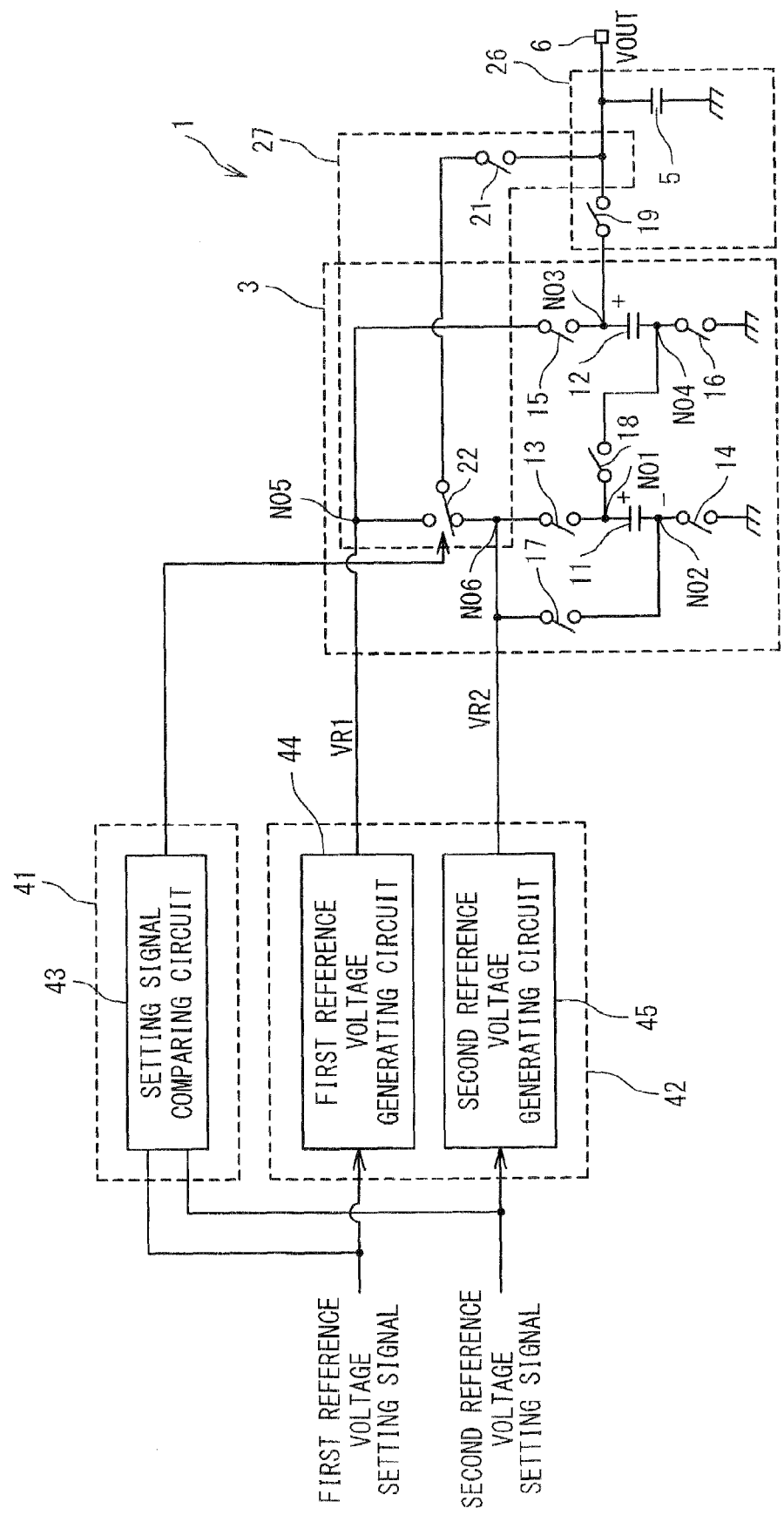
FIG. 13 is a circuit diagram showing a configuration of the charge pump type boosting circuit according to a second embodiment of the present invention.

FIG. 13 is a circuit diagram showing a configuration of a charge pump type boosting circuit 1 in the second embodiment. Referring to FIG. 13, the charge pump type boosting circuit 1 in the second embodiment includes a switching signal generating circuit 41 and a power supply section 42. The switching signal generating circuit 41 includes a setting signal comparing circuit 43 for comparing a voltage represented by a first reference voltage setting signal (first reference voltage VR1) with a voltage represented by a second reference voltage setting signal (second reference voltage VR2). The power supply section 42 includes a first reference voltage generating circuit 44 for generating the first reference voltage VR1 in response to the first reference voltage setting signal and a second reference voltage generating circuit 45 for generating the second reference voltage VR2 in response to the second reference voltage setting signal.

In the charge pump type boosting circuit 1 in the first embodiment, the first reference voltage VR1 and the second reference voltage VR2 are applied from the outside of the boosting circuit. The present invention is not limited to such a configuration. It is also possible to form a circuit (power supply section 42) generating the first reference voltage VR1 and the second reference voltage VR2 together with the charge pump type boosting circuit 1 on the same chip and apply the present invention to the multi-purpose circuit which varies the first reference voltage VR1 and the second reference voltage VR2 according to the setting signals. The charge pump type boosting circuit 1 in the second embodiment controls the path switch 22 by using the setting signal comparing circuit 43 for comparing the setting signals.

FIG. 14 is a switch setting table 46 showing relationship among a set value of the output voltage of the power supply section 42 (hereinafter to be referred to as an output voltage set value), a switching signal outputted from the setting signal comparing circuit 43 and a connection state of the path switch 22. As shown in the switch setting table 46, when the output voltage set value of the power supply section 42 represents VR1<VR2, the path switch 22 is connected to a side of the second reference voltage generating circuit 45, and when the output voltage set value represents VR1>VR2, the path switch 22 is connected to a side of the first reference voltage generating circuit 44.

While the comparator 7 in the first embodiment compares the output voltage of the first power supply 8 and the output voltage of the second power supply 9 in an analog fashion, the setting signal comparing circuit 43 in the second embodiment logically compares the output voltage setting signals for generating the first reference voltage VR1 and the second reference voltage VR2. The setting signal comparing circuit 43 in the second embodiment can switch the path switch 22 without forming an analog circuit. Thus, it is possible to suppress an increase in an area of the circuit having the charge pump type boosting circuit 1.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. A boosting circuit comprising:

a power supply section comprising a first power supply configured to supply a first reference voltage and a second power supply configured to supply a second reference voltage;

a boosting section comprising boosting switches and boosting capacitors, and configured to generate a boosted voltage to an output node by using said boosting switches and said boosting capacitors in response to the first reference voltage and the second reference voltage; and a switching circuit configured to connect the output node and one of said first power supply and said second power supply based on a difference between the first reference voltage and the second reference voltage.

2. The boosting circuit according to claim 1, further comprising:

a comparator configured to compare the first reference voltage and the second reference voltage, wherein said switching circuit connects said output node with one of said first power supply and said second power supply based on the comparison result from said comparator.

3. The boosting circuit according to claim 2, wherein said comparator outputs a first comparison signal when the first reference voltage is higher than the second reference voltage, and a second comparison signal when the second reference voltage is higher than the first reference voltage, and said switching circuit connects said first power supply and said output node in response to the first comparison signal, and connects said second power supply and said output node in response to the second comparison signal.

4. The boosting circuit according to claim 1, wherein said first power supply and said second power supply are formed on a same semiconductor chip as said boosting section, said first power supply generates the first reference voltage in response to a first reference voltage setting signal, and said second power supply generates the second reference voltage in response to a second reference voltage setting signal.

5. The boosting circuit according to claim 4, further comprising:

a comparing circuit configured to compare the first reference voltage set in response to the first reference voltage setting signal and the second reference voltage set in response to the second reference voltage setting signal, wherein said switching circuit connects said output node and one of said first power supply and said second power supply based on the comparison result from said comparator.

6. The boosting circuit according to claim 5, wherein said comparing circuit outputs a first comparison signal when the first reference voltage is higher than the second reference voltage and a second comparison signal when the second reference voltage is higher than the first reference voltage, and said switching circuit connects said first power supply and said output node in response to the first comparison signal, and connects said second power supply and said output node in response to the second comparison signal.

7. The boosting circuit according to claim 1, wherein each of said boosting switches comprises a transfer gate of MOS transistors formed on a substrate, one of said MOS transistors has a back gate to which a substrate voltage is supplied, and the back gate is connected with said output node.

8. The boosting circuit according to claim 7, wherein one of said MOS transistors is a P channel MOS transistor formed on an N well or an n-type semiconductor substrate and having the back gate, and a maximum voltage of said boosting circuit which is supplied through said output node is applied to said N well or said n-type semiconductor substrate as the back gate.

9. An integrated circuit comprising:

a boosting circuit configured to generate a boosted voltage through an output node; and a control circuit configured to generate a control signal to control said boosting circuit, wherein said boosting circuit comprises:

a power supply section comprising a first power supply configured to supply a first reference voltage and a second power supply configured to supply a second reference voltage;

a boosting section configured to generate the boosted voltage in response to the first reference voltage and the second reference voltage;

a comparator configured to compare the first reference voltage and the second reference voltage; and a switching circuit configured to control connection of an output node and said power supply section, wherein said comparator outputs a first comparison signal when the first reference voltage is higher than the second reference voltage and a second comparison signal when the second reference voltage is higher than the first reference voltage, and wherein said switching circuit connects said first power supply and said output node in response to the first comparison signal and connects said second power supply and said output node in response to the second comparison signal.

10. The integrated circuit according to claim 9, wherein said boosting circuit further comprises a connection switch configured to disconnect said switching circuit from said output node in response to the control signal.

11. The integrated circuit according to claim 10, wherein said control circuit stops supply of an operation clock signal which is used for an operation of said boosting circuit in response to the control signal.

* * * * *